E. S. & C. D. STEWART.
TESTING DEVICE.
APPLICATION FILED MAY 26, 1913.
1,161,082.
Patented Nov. 23, 1915.
2 SHEETS—SHEET 1.
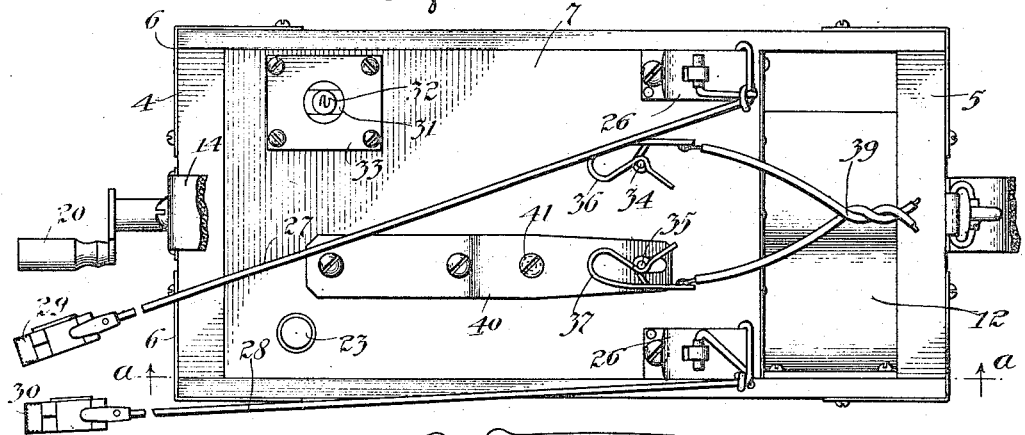
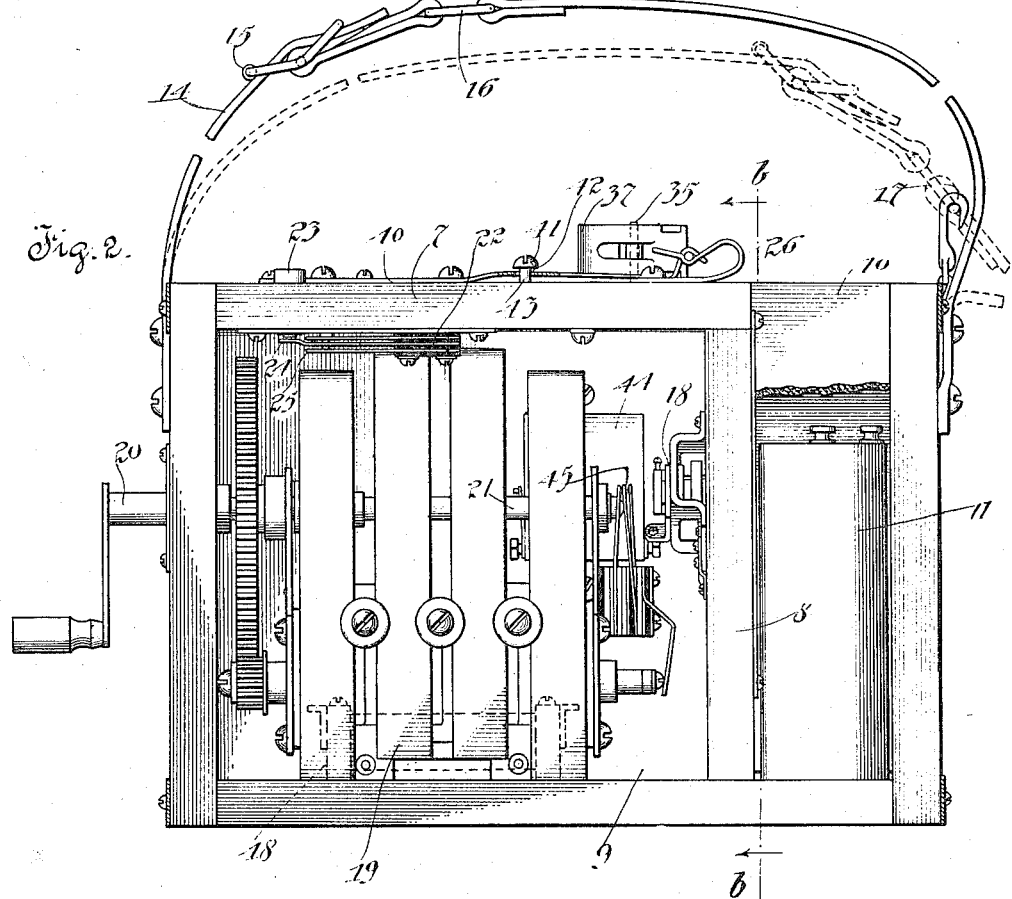
Witnesses
Arthur W. Carlson
Robert F. Weir
Inventors
Edward Scott Stewart
Christopher Douglass Stewart
By May W. Zabel
Atty.

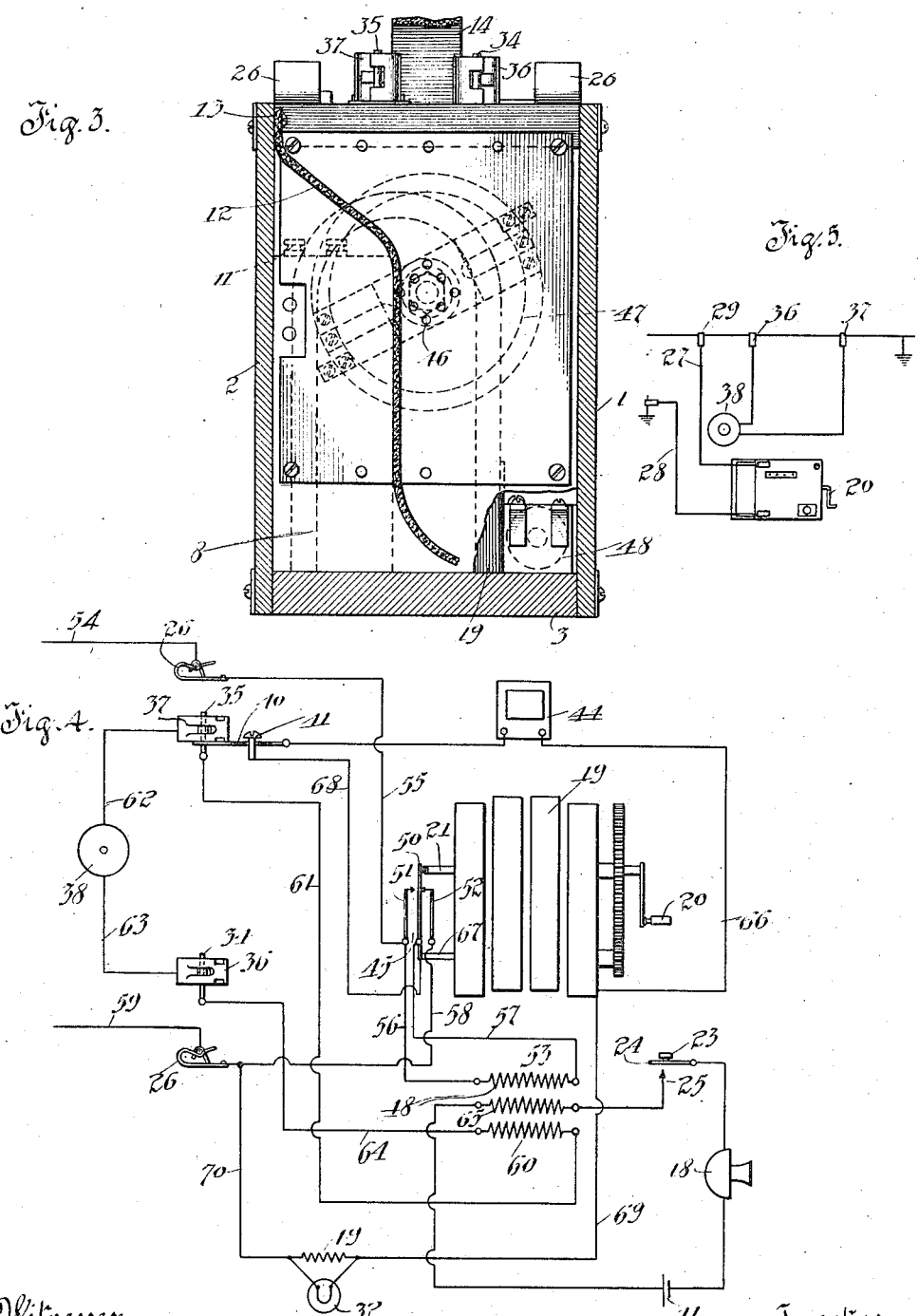

UNITED STATES PATENT OFFICE.

EDWARD SCOTT STEWART AND CHRISTOPHER DOUGLASS STEWART, OF OTTAWA, ILLINOIS.

TESTING DEVICE.

1,161,082.   Specification of Letters Patent.   Patented Nov. 23, 1915.

Application filed May 26, 1913. Serial No. 769,888.

*To all whom it may concern:*

Be it known that we, EDWARD S. STEWART and CHRISTOPHER D. STEWART, citizens of the United States, residing at Ottawa, in the county of La Salle and State of Illinois, have invented a certain new and useful Improvement in Testing Devices, of which the following is a full, clear, concise, and exact description, reference being had to the accompanying drawings, forming a part of this specification.

Our invention relates to testing sets and more particularly to those kind of testing test sets that are adapted for use by linemen.

Our improved apparatus when used on a line circuit having a fault and when properly actuated will indicate the direction of the fault along the line circuit from the position occupied by the tester. Our improved testing device is also arranged to give a close approximation of the distance between the observer and the fault to be located. In order to detect which side of the observer the fault is on we utilize a low resistance receiver preferably in association with a low resistance secondary winding of an induction coil. The receiver circuit—*i. e.* either the receiver direct, or the primary circuit of the induction coil when such is used—is designed to be connected in shunt with a small portion of a line conductor first on one side of the point of test and then on the other, and this will indicate the direction of the fault.

In order to get a close approximation of the distance of the fault away from the observer we provide a suitable indicating device which in this instance is shown as a lamp and which by the degree of illumination indicates to the skilled eye of the observer the distance the fault is away from the observer.

Our invention further contemplates the provision of a suitable generator preferably of the magneto type within the device, which generator is provided with switching means to control the talking circuit of the test set. This generator in association with a suitable current interrupting device is designed also to impress a certain current of a distinctive character on the line circuit for testing purposes, which distinctive current can be plainly heard in a receiver circuit, and which distinctive current causes actuation of the receiver in such a manner that it can be readily distinguished from other noises or current undulations coming over the circuit.

We will explain our invention more in detail by referring to the accompanying drawings, in which—

Figure 1 is a top view of our improved test set; Fig. 2 is a sectional view on line *a—a* of Fig. 1; Fig. 3 is a sectional view on line *b—b* of Fig. 2; Fig. 4 is a diagrammatic view illustrating the circuit arrangements of our improved device, and Fig. 5 is a circuit arrangement indicating how the instrument is used.

Referring more specifically to Figs. 1, 2 and 3, our improved device consists of a box-like structure having the side walls 1 and 2, the base plate 3, and the end walls 4 and 5. Corner braces 6 are provided to make a more substantial structure. A cover plate 7 closes the greater portion of this box-like structure in connection with the interior wall 8, to provide a compartment 9. To the right (Fig. 2) of the wall 8 is a further compartment 10, which compartment holds a battery 11 indicated by dotted lines in Fig. 3. A flexible cover 12 consisting preferably of a piece of leather is fastened at the upper extremity of the compartment 10 by the screws 13 and when laid downwardly as shown more clearly in Fig. 4 covers the battery, leaving however at the same time suitable space within which a watch case receiver may be placed. The box is provided with an adjustable strap 14, adjustable by means of the buckle 15. This strap has a preferably circular link 16 interposed at a portion of its length, which link is adapted for use in connection with the hook 17. Normally the link 16 is not in connection with the hook 17, so that the test set may be carried over the shoulder, the strap 14 being long enough for that purpose. When however the lineman is using the test set for communicational purposes, then the link 16 is hooked over the hook 17, thus shortening this strap and making it the right size so that when placed around the neck the testing device rests on the chest of the lineman so that when talking the vibrations are carried directly to the transmitter in the test set, or if preferred the lineman may talk into the compartment 10, which thereupon more directly actuates the transmitter 18 which is mounted upon the wall 8. Within the compartment 9 into which the transmitter 18 projects there is also mounted a generator 19 whose various functions will be more thoroughly explained later. This generator is provided with the customary crank 20 adapted when this crank is turned clockwise to press the shaft 21 to the right (Fig. 2) as is customary with generators of this kind. Within the compartment 9 there is also mounted an induction coil 48, shown more clearly in Fig. 3 where a portion of the wall 8 is broken away to reveal this induction coil. Within the compartment 9 there is further mounted a switching mechanism 22 adapted to be actuated by a push button 23. This switching device is adapted to close the transmitter circuit as will presently appear through the agency of the springs 24 and 25. Suitable spring clips 26, 26 are provided in which the line circuit of the device is terminated and from which, preferably by means of flexible conductors 27, and 28, connection may be made with line wires through the use of the spring connectors 29 and 30. Below a small window 31 an incandescent lamp 32 is mounted to the top plate 7, the widow 31 being suitably held in place by the cap plate 33. The uses to which this lamp is put will also presently be explained.

Suitable connecting posts 34 and 35 are provided to which by means of spring clips 36 and 37 the watch case receiver 38 is to be connected through the agency of the flexible conductors 39. A connecting spring 40 is mounted on the plate 7 and is adapted under certain conditions to contact with a conducting screw 41. This screw as more clearly shown in Fig. 2 is also mounted upon the cover plate 7, but the spring 40 has an aperture 42 large enough not to engage the shank 43 of the screw 41. This spring 40 also has an opening so that it may encircle without touching the upwardly extending contact post 35. When the spring clip 37 is in place the spring 40 is pressed downwardly so that it does not contact with the screw 41. When, however, this clip 37 is removed from the contact post 35, then the spring 40 springs upwardly into engagement with the head of the screw 41 and establishes a contact. Within the compartment 9 there is also mounted a buzzer 44 whose purpose will presently appear. Suitable contact springs 45 are provided and under the control of the generator shaft 21. The wall 8 is provided with a plurality of perforations 46 opposite the center of the transmitter diaphragm 47 so that when talking into the compartment 10 the sound travels directly against the transmitter 18 as is desired.

We will now explain the various circuit conditions. A suitable resistance 49 is in shunt with the lamp 32 and the switching mechanism 45 under the control of the generator consists of the springs 50, 51 and 52.

Having thus described the various elements which are included in our improved test set, we will now explain the circuit arrangements of our improved device. The induction coil 48 has a primary winding 53 which normally extends from the line conductor 54, contact clip 26, conductor 55, conductor 56, winding 53, conductor 57, spring 50, spring 52, conductor 58, contact 26 to the line wire 59. This induction coil, thus when the parts are in the position shown, may transmit incoming voice currents to a very low resistance winding 60 of this induction coil, which low resistance winding is in series with the receiver 38, the circuit being traced from the winding 60 through conductor 61, contact spring 37, conductor 62, receiver 38, conductor 63, contact spring 36, conductor 64 to the winding 60. The induction coil 48 is also provided with a third winding 65, which winding is adapted for serial inclusion with the transmitter 18 through the interposition of the switching device consisting of the springs 24 and 25 as will be readily clear from an inspection of Fig. 4.

When talking into the transmitter 18 the windings 65 and 53 are used and these may be of the ordinary type used in connection with induction coils. When, however, the operator's receiver 38 is used the very low resistance winding 60 is in circuit because this receiver 38 is a very low resistance receiver and thus requires a very low resistance secondary winding. The object in making this receiver of very low resistance is that this receiver is to be connected in shunt with a small section of a line conductor in order to test on which side of the observer the fault is located. After the receiver together with its clips 37 and 36 has been removed from the instrument and connected in shunt with a small section of the conductor, distinctive current conditions are impressed on the line by the generator 19, as will be presently explained, and if these distinctive current conditions are discerned in the receiver, the fault is on that side of the line to which this receiver is connected. This is true because the distinctive current conditions are sent out serially over the conductor and will therefore not to any appreciable degree travel along that portion of the conductor which has no fault. This is shown more clearly in Fig. 5. Little or no current would pass to the left in Fig. 5, for instance, and should this receiver be connected to the line wire to the left of the connector 29, no distinctive current indications approximating in volume that to be heard to the right of the connector 29 would be heard in this receiver 38. When the clip 37 is removed in making this test the spring 40 of course engages the screw 41 and this establishes a circuit condition within the instrument by virtue of which the buzzer 44 is included in series with the generator 19 as is desired in order to establish the distinctive current conditions. The generator 19 gives the ordinary sine wave alternating current and when the current during each cycle reaches substantially its maximum the armature of this ordinary buzzer 44 is attracted to thereby open the circuit and cause a heavy discharge of current over the line wires 54, 59.

Normally when the generator is being actuated the springs 50 and 51 are in contact and under these conditions it will be seen that the generator is practically short circuited through the buzzer 44. The short circuit around the generator can be traced from buzzer 44 through conductor 66, generator 19, through the armature of the generator to the protruding stub 67, spring 50, conductor 68, screw 41, spring 40 to the buzzer 44. Now as stated, as soon as this buzzer breaks this short circuit, then the current from the generator travels from the generator through conductor 69, lamp 32 and resistance 49 in parallel, conductor 70, to line 59 to line 54, conductor 55, spring 51, spring 50, stub 67, through the armature of the generator to the frame of the generator and conductor 66. The impulse which is sent out is thus of such character that it has a very high frequency, and thus will not pass in appreciable amounts through such bridges as might be found across the line, which bridges would consist of the ordinary bridging ringers which have quite a high impedance. All of this distinctive current therefore would practically flow through the fault and such bridges as were to be found on the line would not materially influence the reading. This distinctive current is then heard in the receiver and that indicates the direction in which the fault is located. When it is desired to ascertain how far the fault is away from the point of test then the receiver clips 37 and 36 are replaced as shown in Fig. 4, under which conditions the buzzer 44 is eliminated from the circuit and the generator 19 when actuated gives a substantial sine wave which may be traced from conductor 54 through clip 26, conductor 55, spring 51, spring 50, stub 67, armature of the generator 19, frame of the generator, conductor 69, lamp 32 and resistance 49 is parallel, conductor 70, spring clip 36 to line 59. Thus a substantial since wave of alternating current is used to ascertain the distance the trouble is away and this current flows in parallel through the lamp 32 and resistance 49. Now the amount of current which will flow, would of course depend on the resistance of the line circuit, and this resistance would be approximately proportional to the length of the line circuit to the fault and therefore depending upon the distance the fault is away from the generator the lamp 32 will burn brightly or merely glow, thus to indicate by the degree of illumination to persons familiar with the use of the apparatus approximately how far the fault is away from the point of test, assuming the fault resistance to be practically negligible. A carbon lamp is used having a negative temperature coefficient, whereas the resistance 49 has a positive temperature coefficient so that the variation in illumination would be enhanced by this bridge arrangement within those limits within which the device is designed for use. The generator controlled springs 50, 51 and 52 serve not only to connect the generator in circuit when the shaft 21 is being rotated but also serve when the generator is standing idle, as shown in Fig. 4, to connect the talking circuit in circuit with the line wires, and this talking circuit can be traced from conductor 54, through conductor 55, conductor 56, induction coil winding 53, conductor 57, spring 50, spring 52, conductor 58 to the line wire 59.

From what has been described the features of our improved test set will be readily apparent to those skilled in the art. It will also be readily apparent that our invention is capable of a variety of modifications within the scope of our invention and that it may be variously used and applied without departing from the spirit of our invention.

Having however, thus described one form which our invention may take, what we claim as new and desire to secure by Letters Patent is:

1. In a device of the character described the combination with means for establishing distinctive circuit conditions on a line circuit, a low resistance receiver adapted for shunt connection with a small portion of said line circuit capable of giving audible signals when said means is connected with said line circuit, and an induction coil one of whose windings is adapted for connection with said line circuit, and the other winding being of very low resistance and adapted for periodic serial inclusion with said low resistance receiver when used for incoming transmission.

2. In a device of the character described the combination with means for establishing distinctive circuit conditions on a line circuit, a low resistance receiver adapted for shunt connection with a small portion of said line circuit capable of giving audible signals when said means is connected with said line circuit, an induction coil, one of whose windings is adapted for connection with said line circuit, and the other winding being of very low resistance and adapted for periodic serial inclusion with said low resistance receiver when used for incoming transmission, said induction coil having a third winding to serve said primary winding for outgoing transmission, and a transmitter and battery adapted for association with said third winding.

3. In a device of the character described the combination with means for establishing distinctive circuit conditions on a line circuit, a low resistance receiver adapted for shunt connection with a small portion of said line circuit capable of giving audible signals when said means is connected with said line circuit, an induction coil, one of whose windings is adapted for connection with said line circuit, and the other winding being of very low resistance and adapted for periodic serial inclusion with said low resistance receiver when used for incoming transmission, said induction coil having a third winding to serve said primary winding for outgoing transmission, and a transmitter, battery, and a switching device serially included in said transmitter circuit adapted for association with said third winding.

4. In a device of the character described the combination with a generator, a shaft for actuating said generator, switching springs under the control of said shaft, a talking circuit including a winding of an induction coil associated with said springs, a generator circuit including a buzzer associated with said springs, a contact spring for said buzzer circuit, a receiver, a connecting clip connected with the circuit of said receiver, and means whereby said connecting clip controls said buzzer circuit contact spring.

5. A test system of the character described having means for establishing distinctive circuit conditions on a line circuit, a line circuit, and a low resistance receiver adapted for shunt connection with a small portion of said line circuit to receive audible signals from said means.

6. In a system of the character described the combination with a magneto generator adapted to have its terminals connected to a line circuit, of a buzzer connected in shunt of said terminals and adapted when said generator is operated intermittently to short circiut said generator.

It witness whereof, we hereunto subscribe our names this seventh day of May, A. D., 1913.

EDWARD SCOTT STEWART.
CHRISTOPHER DOUGLASS STEWART.

Witnesses:
P. G. School,
Otis M. Bach.